(12) United States Patent
Howson

(10) Patent No.: US 9,390,547 B2
(45) Date of Patent: Jul. 12, 2016

(54) UNTRANSFORMED DISPLAY LISTS IN A TILE BASED RENDERING SYSTEM

(71) Applicant: Imagination Technologies Limited, Kings Langley (GB)

(72) Inventor: John W. Howson, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 66 days.

(21) Appl. No.: 14/297,046

(22) Filed: Jun. 5, 2014

(65) Prior Publication Data

US 2014/0368503 A1 Dec. 18, 2014

Related U.S. Application Data

(63) Continuation of application No. 13/744,161, filed on Jan. 17, 2013, now Pat. No. 9,030,474, which is a continuation of application No. 12/383,119, filed on Mar. 19, 2009, now Pat. No. 8,368,691.

(30) Foreign Application Priority Data

Mar. 19, 2008 (GB) .................................. 0805146.8

(51) Int. Cl.
*G06T 15/08* (2011.01)
*G06T 1/60* (2006.01)
*G06T 15/00* (2011.01)
*G06T 15/40* (2011.01)
*G06T 15/80* (2011.01)

(52) U.S. Cl.
CPC . *G06T 15/08* (2013.01); *G06T 1/60* (2013.01); *G06T 15/005* (2013.01); *G06T 15/40* (2013.01); *G06T 15/80* (2013.01)

(58) Field of Classification Search
USPC ................................... 345/419, 421, 537, 581
See application file for complete search history.

(56) References Cited

U.S. PATENT DOCUMENTS

| 6,344,852 | B1 * | 2/2002 | Zhu | G06T 15/005 345/418 |
|---|---|---|---|---|
| 6,348,919 | B1 * | 2/2002 | Murphy | G06T 15/005 345/421 |
| 6,697,063 | B1 * | 2/2004 | Zhu | G06T 15/005 345/421 |
| 6,819,321 | B1 * | 11/2004 | Hsieh | G06T 15/005 345/419 |
| 7,042,460 | B2 * | 5/2006 | Hussain | G06T 11/40 345/531 |
| 7,167,181 | B2 * | 1/2007 | Duluk, Jr. | G06T 15/005 345/421 |
| 7,170,515 | B1 * | 1/2007 | Zhu | G06T 15/005 345/422 |
| 8,004,521 | B2 * | 8/2011 | Falchetto | G06T 15/40 345/422 |
| 2007/0220525 | A1 * | 9/2007 | State | G06F 9/4881 718/107 |

* cited by examiner

Primary Examiner — Kimbinh T Nguyen
(74) Attorney, Agent, or Firm — Vorys, Sater, Seymour and Pease LLP; Vincent M DeLuca

(57) ABSTRACT

3-D rendering systems include a rasterization section that can fetch untransformed geometry, transform geometry and cache data for transformed geometry in a memory. As an example, the rasterization section can transform the geometry into screen space. The geometry can include one or more of static geometry and dynamic geometry. The rasterization section can query the cache for presence of data pertaining to a specific element or elements of geometry, and use that data from the cache, if present, and otherwise perform the transformation again, for actions such as hidden surface removal. The rasterization section can receive, from a geometry processing section, tiled geometry lists and perform the hidden surface removal for pixels within respective tiles to which those lists pertain.

17 Claims, 3 Drawing Sheets

A tile based rendering system using untransformed display lists

UNTRANSFORMED DISPLAY LISTS IN A TILE BASED RENDERING SYSTEM

This invention relates to a three-dimensional computer graphics rendering system and in particular to methods and apparatus associated with rendering three-dimensional graphic images utilising an untransformed display list within a tile based rendering system.

BACKGROUND TO THE INVENTION

Tile based rendering systems are well known, these subdivide an image into a plurality of rectangular blocks or tiles in order to increase efficiency of the rasterisation process.

FIG. 1 illustrates a traditional tile based rendering system. Tile based rendering systems operate in two phases, a geometry processing phase and a rasterisation phase. During the geometry processing phase a primitive/command fetch unit 100 retrieves command and primitive data from memory and passes this to a geometry fetch unit 105 which fetches the geometry data 110 from memory and passes it to a transform unit 115. This transforms the primitive and command data into screen space and applies any lighting/attribute processing as required using well-known methods. The resulting data is passed to a culling unit 120 which culls any geometry that isn't visible using well known methods. The culling unit writes any remaining geometry data to the transformed parameter buffer 135 and also passes the position data of the remaining geometry to the tiling unit 125 which generates a set of screen space objects lists for each tile which are written to the tiled geometry lists 130. Each object list contains references to the transformed primitives that exist wholly or partially in that tile. The lists exist for every tile on the screen, although some object lists may have no data in them. This process continues until all the geometry within the scene has been processed.

During the rasterisation phase the object lists are fetched by a tiled parameter fetch unit 140 which first fetches the object references and then the object data referenced and supplies them to a hidden surface removal unit (HSR) 145 which removes surfaces which will not contribute to the final scene (usually because they are obscured by another surface). The HSR unit processes each primitive in the tile and passes only data for visible primitives/pixels to a texturing and shading unit (TSU) 150. The TSU takes the data from the HSR unit and uses it to fetch textures and apply shading to each pixel within a visible object using well-known techniques. The TSU then supplies the textured and shaded data to an alpha test/fogging/alpha blending unit 155. This is able to apply degrees of transparency/opacity to the surfaces again using well-known techniques. Alpha blending is performed using an on chip tile buffer 160 thereby eliminating the requirement to access external memory for this operation. It should be noted that the TSU and alpha test/fogging/alpha blend units may be fully programmable in nature.

Once each tile has been completed, a pixel processing unit 165 performs any necessary backend processing such as packing and anti-alias filtering before writing the resulting data to a rendered scene buffer 170, ready for display.

Typically modern computer graphics applications utilise a significant amount of geometry that remains static throughout a scene or across multiple scenes, this geometry data is stored in what is commonly known as static vertex buffers that typically reside in memory that is local to the graphics processing unit. Current tile based systems transform this data into screen space and store the resulting geometry within a parameter buffer/tiled screen spaced geometry list that can consume a considerable amount of additional storage and memory bandwidth.

SUMMARY OF THE INVENTION

Preferred embodiments of the present invention provide a method and apparatus that allow a the based rendering system to operate with a reduced amount of storage required for tiled screen space geometry. This is accomplished by the use of an untransformed display list to represent the scene's geometry. This removes the need for the transformed parameter buffer 135 in FIG. 1 by utilising the fact that the incoming scene geometry is static and so it can be referenced in both the geometry processing and rasterisation phases.

BRIEF DESCRIPTION OF THE DRAWINGS

Preferred embodiments of the invention will now be described in detail by way of example with reference to the accompanying drawings in which.

DETAILED DESCRIPTION OF PREFERRED EMBODIMENTS

Figure 1:
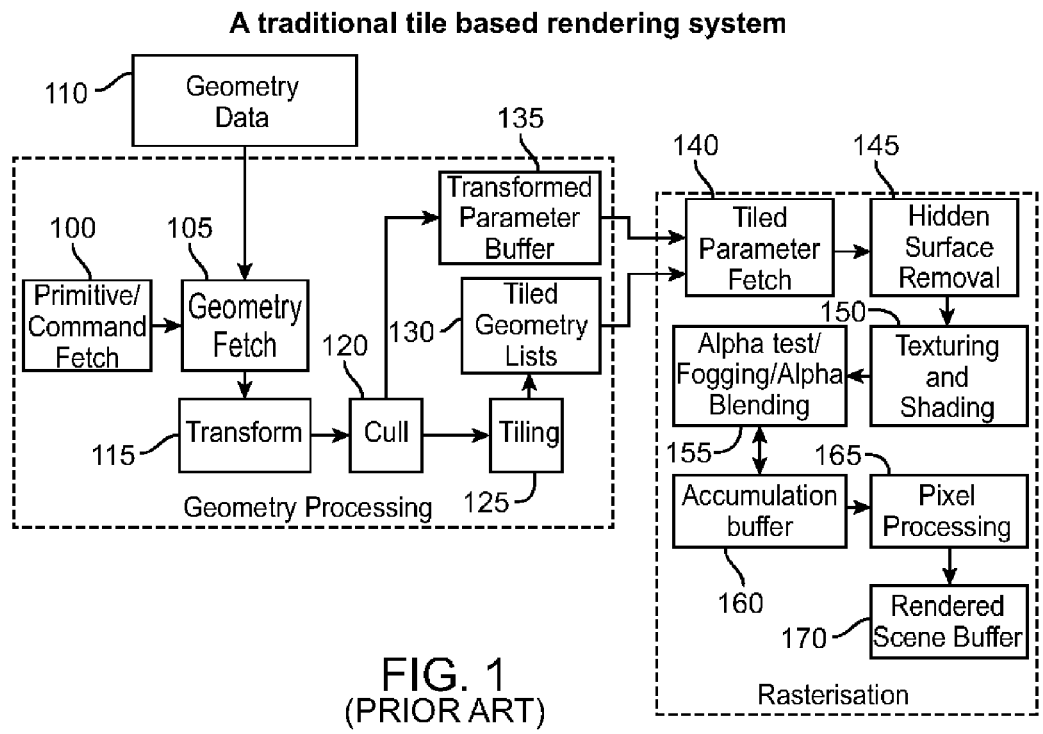
FIG. 1 illustrates a traditional tile based rendering system.
Figure 2:
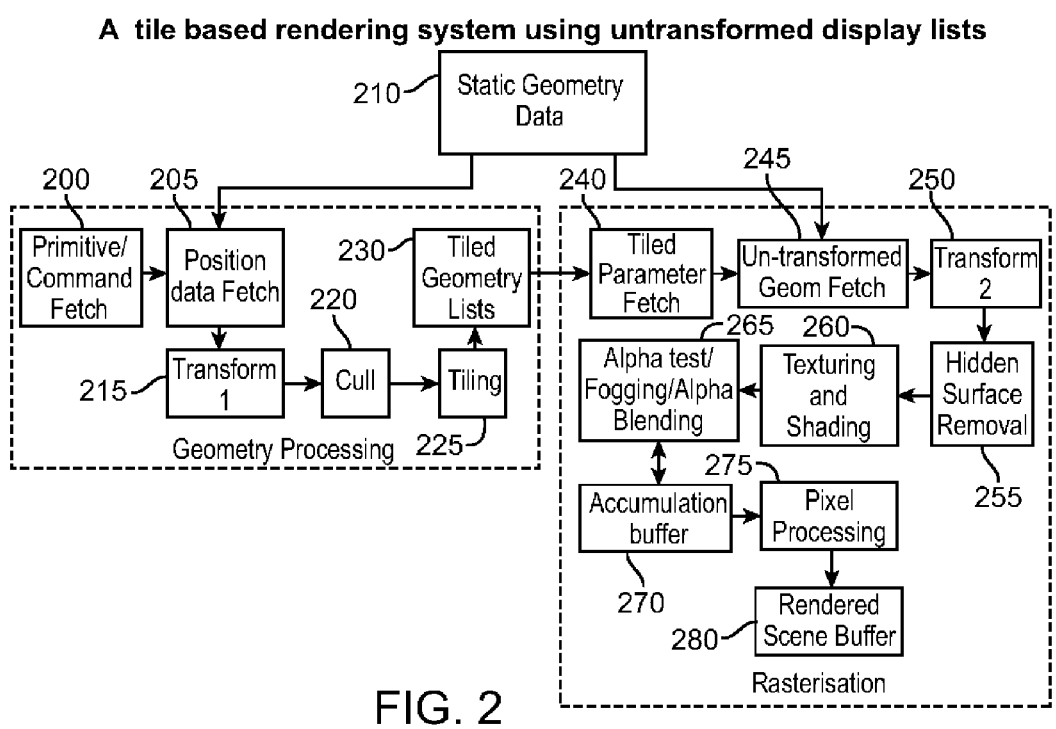
FIG. 2 illustrates a tile based rendering system using an untransformed display list.

FIG. 2 illustrates a tile based rendering system that has been modified to support an untransformed display list. During the geometry processing phase a primitive/command fetch unit 200 retrieves command and primitive data from memory and passes this to a position data fetch unit 205 which fetches a position part of static geometry data from memory 210 and passes it to transform 1 unit 215. This transforms the primitive into screen space only i.e. it does not apply any lighting/attribute processing as would occur in the system of FIG. 1. The resulting screen space position data is passed to a culling unit 220 which culls any geometry in the same manner as the system of FIG. 1. Unlike the system of FIG. 1 the culling unit does not write the remaining geometry data to a transformed parameter buffer, instead it only passes the position data of the remaining geometry to a tiling unit 225.

In the system of FIG. 1, the tiling unit generates references to transformed geometry that has been stored in the transformed parameter buffer, in the new system the tiling unit generates references to the untransformed static geometry data which are written to the tiled geometry lists 230 as before. These references are in the form of pointers to the geometry data in the memory 210. This process continues until all the geometry within the scene has been processed.

During the rasterisation phase object lists for each tile are fetched by a tiled parameter fetch unit 240 which supplies the static geometry references (pointers) from the total geometry lists to untransformed geometry fetch unit 245 which fetches the untransformed static geometry data from memory 210 and passes it to the transform 2 unit 250. The transform 2 unit retransforms the retrieved data to screen space and applies any required lighting/attribute processing etc to the geometry. The transformed geometry is then passed to hidden surface removal unit (HSR) 255 which removes surfaces which will not contribute to the final scene as in the system of FIG. 1. The remaining stages 260 through to 280 all operate in the same manner as stages 150 through 170 (in FIG. 1) as described above. [John: should FIG. 2 also include a source of dynamic geometry?]

Figure 3:
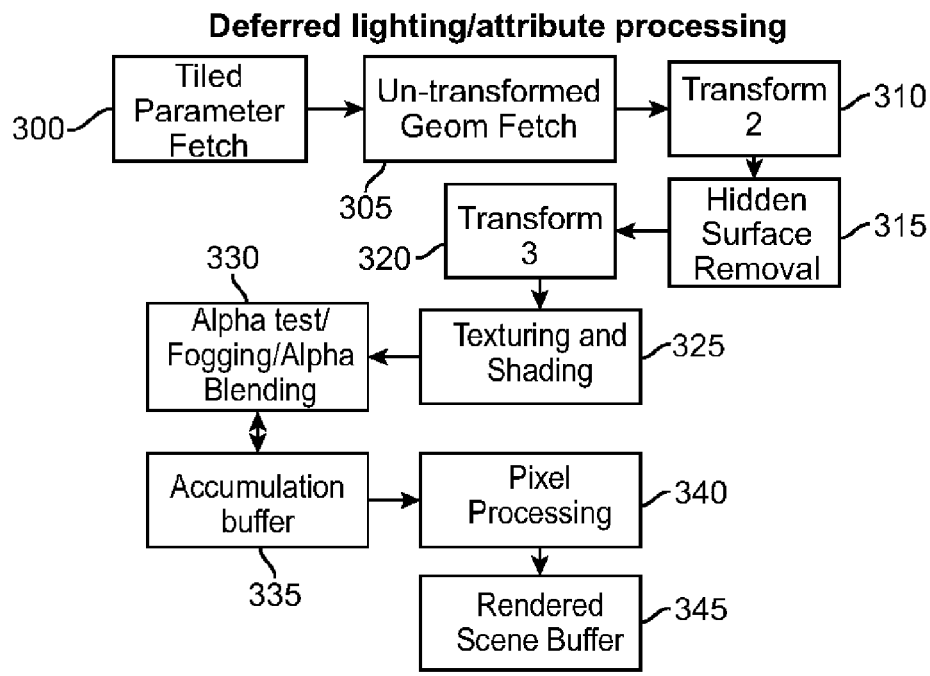
FIG. 3 illustrates deferred lighting/attribute processing.

In a further optimisation it is possible to defer any lighting or attribute processing that is required after hidden surface removal has been performed. This means that this processing is only applied to that geometry which is visible within the final scene giving significant improvements in both throughput and power consumption. FIG. 3 illustrates a modification to the system that implements deferred lighting/attribute processing. Units 300 and 305 operate as described for units 240 and 245 of FIG. 2, unlike unit 250 in FIG. 2 the transform 2 unit 310 only transforms the position data before passing it onto the hidden surface removal unit 315. The visible primitives emitted by the hidden surface removal unit are then passed to transform 3 unit 320 where any lighting/attribute processing is performed. The operation of units 325 to 350 is the same as units 145 to 170 in FIG. 1.

Figure 4:
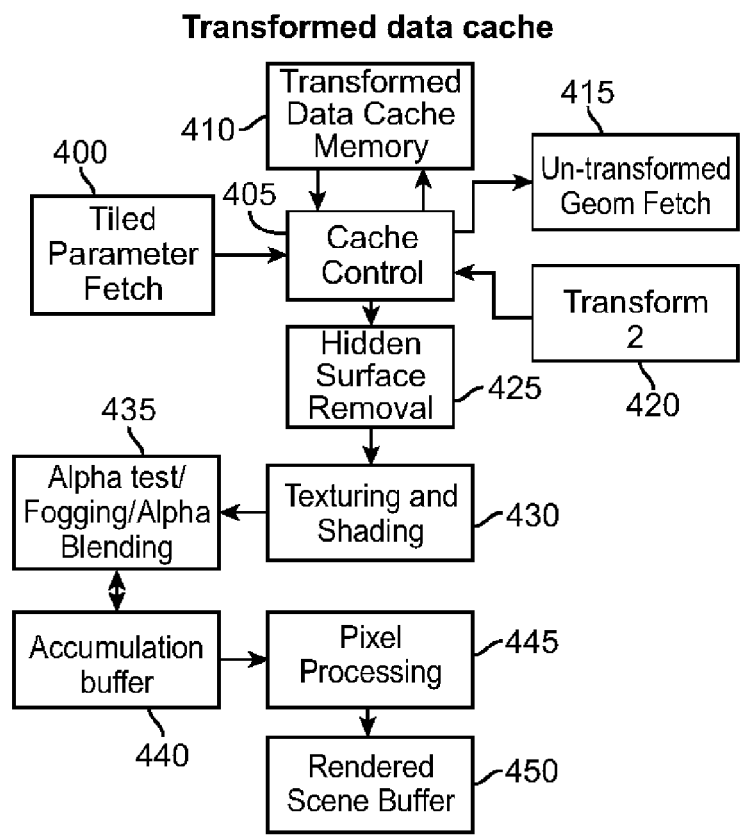
FIG. 4 illustrates the addition of a transformed data cache to the system.

It should be noted that each of the three transformation units mentioned above could all be implemented in a single "universal" unit similar to that described in our British Patent Application GB-A-2430513. Although the above approaches eliminate the need for a transformed parameter buffer they have the disadvantage of requiring the position data to be transformed in both phases and for the transformation to be repeated for every tile that any piece of geometry overlaps. FIG. 4 illustrates a modification to the rasterisation phase of the untransformed display list system in which a cache is added in order to minimise the number of times the data is retransformed in the rasterisation phase. It should be noted that although FIG. 4 shows a modification with respect to a non deferred lighting/attribute processing system it is equally applicable to either. As in FIG. 2 the tiled parameter fetch unit 400 fetches the tiled object list references generated in the geometry processing phase from memory. The references are passed to a cache control unit 405 which checks to see if there is an entry in the transformed data cache memory 410 that corresponds to the object reference, if there is the cache control unit reads the data from the cache and passes it to the hidden surface removal unit 425. If there is no corresponding entry in the cache the cache control unit issues the reference to the untransformed geometry fetch unit 415 which fetch the data from memory and passes it to the transform 2 unit 420. The transform 2 unit transforms and applies any lighting/attribute process required to the geometry data and then passes it back to the cache control unit The cache control unit then adds it to the transformed data cache memory for future reference before passing it to the hidden surface removal unit. The operation of units 425 to 450 is the same as units 145 to 170 in FIG. 1.

In order to eliminate the additional geometry processing pass used in the above approach the result of the position transform can be stored in a parameter buffer for use in the second pass. Although this results in the need for, transformed parameter storage it may be consider a useful trade off compared against transforming the position data multiple times. It should also be noted that there are cases were an application will update the vertex data during a scene, this type of vertex data is often referred to as dynamic, in these circumstances the data must be transformed and copied to a parameter buffer as per a conventional tile based rendering device.

Figure 5:
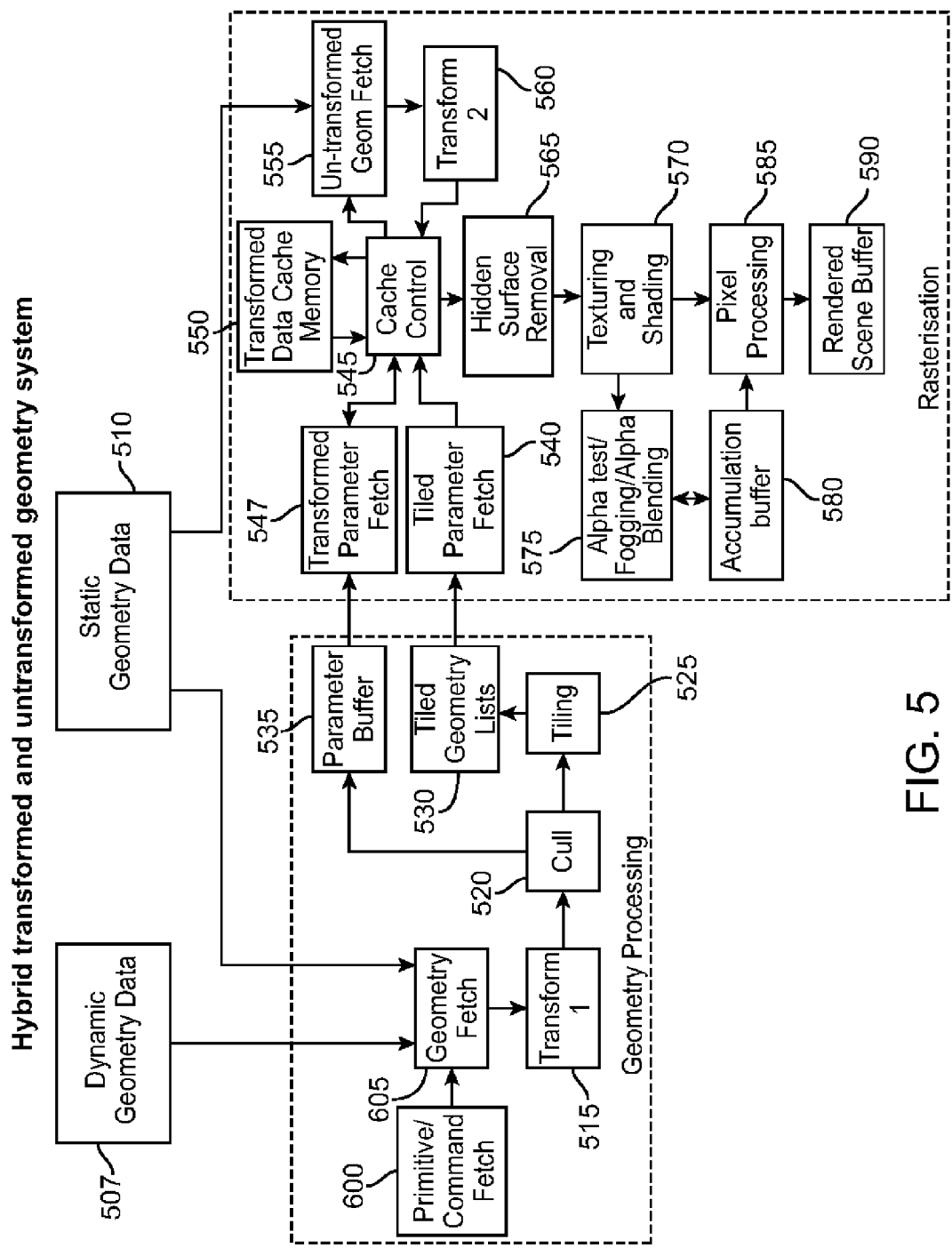
FIG. 5 illustrates a hybrid transformed/untransformed display list based tile based rendering system.

FIG. 5 illustrates a hybrid system that allows the use of both untransformed and transformed display lists. During the geometry processing phase a primitive/command fetch unit 500 retrieves command and primitive data from memory and passes this to the geometry fetch unit 505 which fetches both the dynamic geometry data 507 and static geometry data 510 from memory and passes it to the transform 1 unit 515.

For dynamic geometry the transform 1 unit transforms the position and applies any required lighting/attribute processing as per a traditional tile based rendering system, for static geometry only the position is transformed as previously described. The resulting data is passed to a culling unit 520 which culls any geometry that isn't visible using well known methods. The culling unit writes any remaining dynamic geometry and static position data to the transformed parameter buffer 535 and also passes the position data of the remaining geometry to the tiling unit 525 which generates a set of screen objects lists for each tile which are written to the tiled geometry lists 530. It should be noted that the tiled geometry lists indicate which geometry is dynamic and which is static. As in FIG. 2 the tiled parameter fetch unit 540 fetches the tiled object list references generated in the geometry processing phase from memory. The references are passed to the cache control unit 545 which checks to see if there is an entry in the transformed data cache memory 550 that corresponds to the object reference, if there is the cache control unit reads the data from the cache and passes it to the hidden surface removal unit 565. If there is no corresponding entry in the cache the cache control unit issues the reference to either the transformed parameter fetch unit 547 or the untransformed geometry fetch unit 555 based on the type indicated in the tiled reference lists. Transformed geometry is fetched by the transformed parameter fetch unit and passed back to the cache control unit and untransformed geometry is fetched by the untransformed geometry fetch unit and processed by transform unit 2 560 before being passed back to the cache control unit. Both geometry types are then written to the cache by the control unit before being passed to the hidden surface removal unit. All subsequent units 565 through to 590 operate as previously described for units 145 through 170 in FIG. 1.

I claim:

1. A 3-D rendering system, comprising:
   a tiling unit configured to produce a respective object list for each tile of pixels within a frame of pixels to be rendered that is divided into a plurality of tiles, each object list identifying geometry elements that overlap its tile;
   a rasterizer comprising a fetch unit, coupled to a memory for storing untransformed data for geometry elements to be used in rendering;
   a transform unit coupled with the fetch unit, and operable to produce transformed data for a geometry element from received untransformed data from the fetch unit;
   a cache;
   a cache controller coupled with the cache, the cache controller operable to receive the transformed data and control storage of the transformed data in the cache; and
   a hidden surface removal unit operable to process an object list for a tile by receiving transformed data from the cache if present, for a geometry element identified in the object list for the tile,
   wherein the system is configured to arrange for the retrieval of untransformed data for a geometry element identified in the object list for provision to the transform unit to produce said transformed data, said transformed data being provided for usage by the hidden surface removal unit and cached in the cache for possible subsequent use.

2. The 3-D rendering system of claim 1, wherein the transform unit initially transforms only a position data for that geometry element and is configured to provide the transformed position data to the cache and for usage by the hidden surface removal unit.

3. The 3-D rendering system of claim 2, wherein the transform unit transforms shading attributes only for geometry elements determined to be visible by the hidden surface removal unit, prior to usage by a texturing and shading unit.

4. The 3-D rendering system of claim 1, wherein the transform unit transforms both position data and shading attributes for that geometry element together, and the hidden surface removal unit is configured to use the position data to determine whether that geometry element is visible at any pixels of the tile.

5. The 3-D rendering system of claim 1, further comprising an initial transform unit coupled to provide transformed geometry data for input to the tiling unit, the initial transform unit coupled for receiving untransformed geometry data from the memory.

6. The 3-D rendering system of claim 1, wherein the fetch unit in the rasterizer is further configured, in response to the transformed geometry data for the geometry element not being in the cache, to fetch the transformed geometry data from a parameter buffer populated by the initial transform unit, if the tiling list indicates that the geometry element is dynamic.

7. The 3-D rendering system of claim 1, wherein the rasterizer further comprises a shading unit, coupled with the hidden surface removal unit and operable to shade a visible surface for pixels in the tiles.

8. The 3-D rendering system of claim 7, wherein the shading unit is configured to use lighting attributes retrieved from the cache, for the visible surfaces, if present, and otherwise, to initiate a fetch of untransformed data for those lighting attributes, for transformation in a transformation unit into transformed lighting attributes, and subsequent usage of said transformed lighting attributes by the shading unit.

9. The 3-D rendering system of claim 1, wherein the fetch unit of the rasterizer is operable to obtain, from the tile object list for the tile of pixels being processed, a respective pointer, for each element of geometry appearing in the tile object list, to untransformed 3-D position information for that element of static geometry, and to retrieve the untransformed 3-D position information for that element of static geometry.

10. The 3-D rendering system of claim 1, further comprising a geometry transformation unit operable to transform 3-D position data for a set of geometry elements, comprising both dynamic geometry and static geometry, to produce respective 2-D position data for all of the geometry elements in the set, and to store the 2-D position data for dynamic geometry elements in a parameter buffer coupled to the rasterization portion.

11. The 3-D rendering system of claim 1, further comprising a parameter buffer for receiving and storing transformed parameters for elements of dynamic geometry, the parameter buffer operable to be read by the rasterizer.

12. A 3-D rendering system, comprising:
a tiling unit configured to produce a respective object list for each tile of pixels within a frame of pixels to be rendered, each object list identifying geometry elements that overlap its tile;
a fetch unit, coupled to a memory storing untransformed geometry data;
a transform unit, coupled with the fetch unit, and operable to receive untransformed data for a geometry element, and to produce transformed data from the untransformed geometry data for that element, the transform unit configured to transform a position portion for provision to the tiling unit, and to transform other elements for use during shading;
a hidden surface removal unit operable to process an object list for a tile, produced by the tiling unit, resulting in identification of visible surfaces of pixels to be shaded;
a texturing and shading unit coupled to the hidden surface removal unit; and
a cache coupled with the transform unit to store transformed data,
wherein the cache is coupled with the texturing and shading unit to provide transformed data to the texturing and shading unit, on request, and if available, and if the requested transformed data is not in the cache, the fetch unit is configured to retrieve untransformed geometry data from the memory.

13. A method of 3-D rendering, comprising:
accessing untransformed data for a surface to be shaded by a texturing and shading unit;
transforming the untransformed data, in a transform unit, to produce transformed data for the surface;
caching the transformed data in a cache memory coupled to the texturing and shading unit;
in response to a request for transformed data, determining whether the cache memory contains the requested transformed data, and if the cache memory does not contain the requested transformed data, fetching untransformed data required to produce the requested transformed data, transforming the fetched untransformed data to produce the requested transformed data, and storing the requested transformed data in the cache memory.

14. The method of 3-D rendering of claim 13, further comprising identifying the surface to be shaded by culling surfaces determined to be hidden by a hidden surface removal unit,
wherein the hidden surface removal unit processes a display list produced by a tiling unit.

15. The method of 3-D rendering of claim 14, further comprising producing the display list to reference untransformed geometry data.

16. The method of 3-D rendering of claim 14, wherein the producing of the display list comprises transforming only position data for untransformed geometry data.

17. The method of 3-D rendering of claim 14, wherein the producing of the display list comprises transforming position and parameter data for untransformed geometry data and caching the transformed parameter data.

* * * * *